United States Patent [19]

Noble

[11] Patent Number: 4,846,129

[45] Date of Patent: Jul. 11, 1989

[54] IGNITION SYSTEM IMPROVEMENTS FOR INTERNAL COMBUSTION ENGINES

[75] Inventor: Gardiner A. Noble, Farmington, Mich.

[73] Assignee: Chrysler Motors Corporation, Highland Park, Mich.

[21] Appl. No.: 154,243

[22] Filed: Feb. 9, 1988

[51] Int. Cl.[4] ..................... F02P 5/145; G01L 23/22
[52] U.S. Cl. ................... 123/425; 123/606; 123/625; 123/634; 123/635; 123/644; 73/115; 73/35; 324/399
[58] Field of Search ............... 123/425, 435, 606, 637, 123/625, 626, 644, 607; 73/35, 115; 324/399

[56] References Cited

U.S. PATENT DOCUMENTS

| | | | |
|---|---|---|---|
| 3,035,224 | 5/1962 | Whaley et al. | 73/35 |
| 3,274,487 | 9/1966 | Johnston | 324/399 |
| 4,090,125 | 5/1978 | Warner | 324/399 |
| 4,233,943 | 11/1980 | Rogora et al. | 123/425 |
| 4,331,117 | 5/1982 | Ginsburgh | 123/425 |
| 4,476,844 | 10/1984 | Kajino | 123/637 |

FOREIGN PATENT DOCUMENTS

| | | | |
|---|---|---|---|
| 0056841 | 8/1982 | European Pat. Off. | 123/425 |
| 55-75572 | 6/1980 | Japan | 324/399 |
| 58-25579 | 2/1983 | Japan | 123/425 |
| 2116329 | 9/1983 | United Kingdom | 123/644 |

Primary Examiner—Andrew M. Dolinar
Attorney, Agent, or Firm—Mark P. Calcaterra

[57] ABSTRACT

This invention relates to a number of improvements in ignition systems of spark ignition engines. A detector is employed to sense the first or "breakdown" phase of spark discharge across the spark plug which causes a short duration high current flow across the plug gap. The detection of the breakdown current enables control over a number of ignition system functions. A pulse transformer is used which enables extremely short duration energization of the spark plug at controllable voltages. The existence of end gas auto-ignition is detected by energizing the spark plug during a period of the operating cycle after top dead center of piston travel. Since the threshold voltage necessary to generate spark discharge at the plug differs in conditions where auto-ignition is occurring versus ordinary combustion, sensing of plug breakdown during such energization provides a means of detecting the occurrence of auto-ignition. Further, in accordance with this invention, the spark plug may be caused to multiply discharge within a short duration which has been found to increase the lean burn limit of the engine. The system further enables the duty cycle of the pulse transformer to be reduced thus allowing use of smaller and lighter weight pulse transformers. The ignition system also provides a means of sensing abnormal conditions in the combustion chamber via the spark plug. Pre-ignition occurring at the spark plug electrode gap will result in a very low breakdown voltage which is detected as an indication of an abnormal condition.

42 Claims, 7 Drawing Sheets

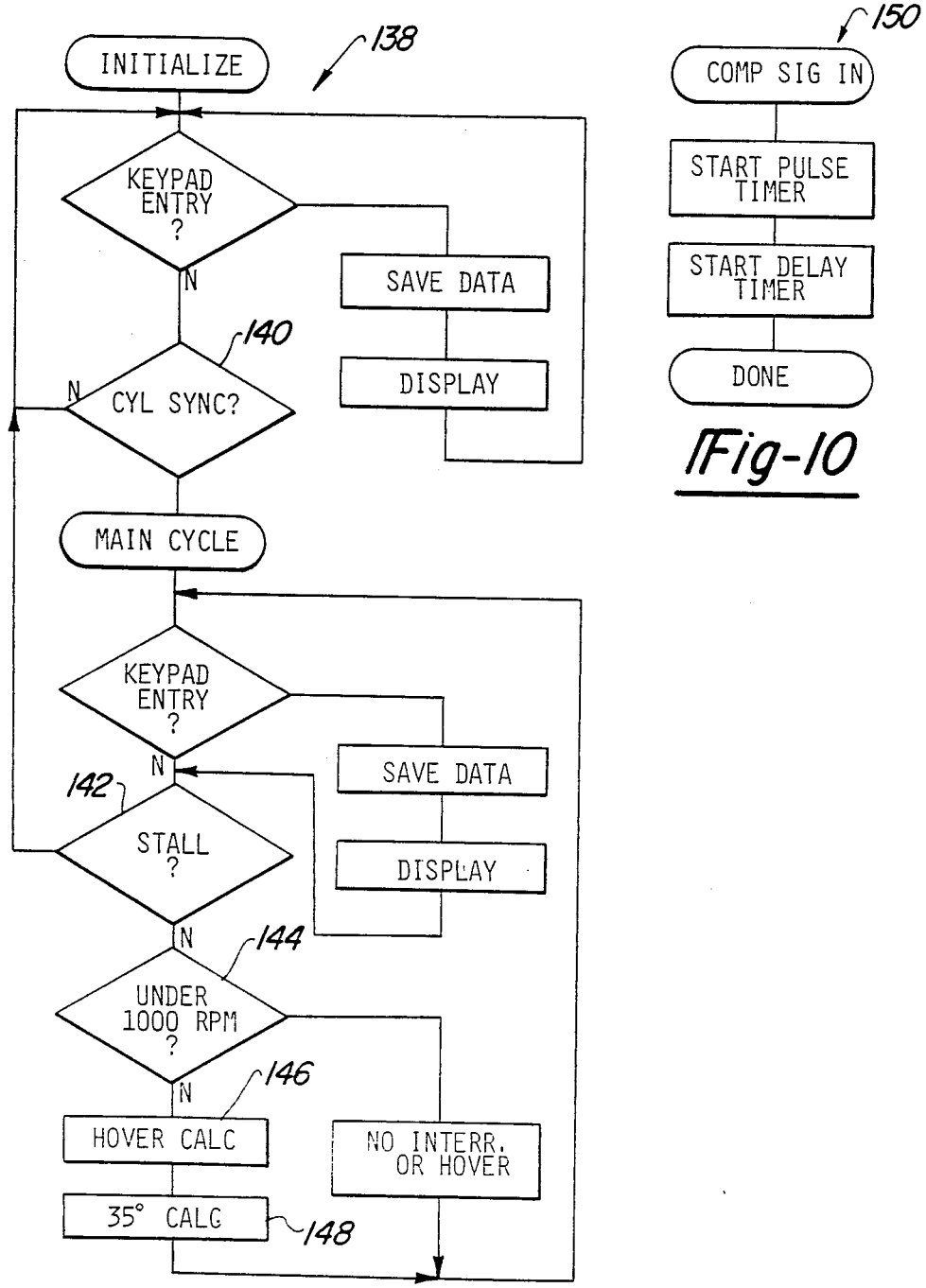

IGNITION SYSTEM IMPROVEMENTS FOR INTERNAL COMBUSTION ENGINES

BACKGROUND OF THE INVENTION

This invention relates to improvements in spark ignition systems of internal combustion engines having the capabilities of improving engine operation by permitting combustion of extremely lean fuel mixtures, more accurately setting and controlling spark timing, and further enabling ignition system components to be designed more efficiently.

In order to initiate combustion of an air/fuel mixture within an internal combustion engine chamber, a spark ignition system is used which generates a high energy arc at the appropriate time in the engine operating cycle. The onset of the arc across a spark plug gap is timed to occur at a predetermined number of degrees of engine crankshaft rotation before the piston reaches top dead center (TDC). If spark timing is established properly, the flame front emanating from the spark plug will cause a pressure peak to develop within the combustion chamber which occurs just after top dead center of the piston during its power stroke. If the spark is initiated too late in the operating cycle (retarded timing) the developed pressure within the combustion chamber will not be efficiently converted to work output. On the other hand, if the spark is initiated too early in the cycle (advanced timing), extemely high and potentially damaging pressure and temperature rises can occur in the combustion chamber which are also not efficiently converted into useful work.

Excessively advanced spark timing can lead to several different types of combustion chamber phenomena. Auto-ignition of the end gases is a condition where the end gases (the unburnt fuel-air mixture that is being ignited by the movement of the flame front) explodes spontaneously when the engine combustion temperatures and pressures become too high. When auto-ignition occurs in the cylinder of the spark engine, pressure therein rises and falls alternately due to the sudden release of chemical energy and temperature rapidly increases. If the rate of energy release is sufficiently high, vibrations within the exploding gas will force the cylinder walls to vibrate, resulting in a characteristic sound referred to as "pinging", or other audible sounds. The rapid fluctuations in pressure and temperature of gases within the combustion chamber caused by auto-ignition occur well after top dead center.

A slight degree of auto-ignition is believed by many engine designers to be desirable because it generates turbulence which hastens the combustion process at a time when the speed of the flame emanating from the spark plug is decreasing. Slight auto-ignition can reduce hydrocarbons left unburnt by the spark-triggered ignition process and simultaneously utilizing the energy released when they are burnt, resulting in lower hydrocarbon emissions as well as improved fuel economy. For these reasons, engine designers often seek to calibrate ignition systems so that spark is advanced to about the threshold of auto-ignition. Care must be taken, however, to avoid excessive auto-ignition which leads to high combustion chamber temperatures which can eventually heat the spark plug electrodes to the point where they initiate the combustion process independently of the spark, thus leading to a phenomena known as pre-ignition. Pre-ignition is marked by extremely high cylinder temperatures and pressures near TDC and can cause significant engine damage, including perforation of the piston. Pre-ignition is frequently referred to as "knock" due to the characteristic audible sound which it generates. Generally, it can be stated that auto-ignition leads to pre-ignition, and subsequently, pre-ignition leads to furthe auto-ignition.

A number of factors influence the timing threshold of generating auto-ignition, including inlet air temperature, engine speed and load, air/fuel ratio, fuel characteristics, and a host of other variables. Spark timing further directly affects engine fuel efficiency and noxious emissions output. Due to the significance of accurately controlling spark timing, numerous engine control systems in present use have microprocessor based closed-loop spark timing control systems which simultaneously measure a number of parameters such as exhaust composition, coolant temperature, and the occurrence of spark knock. These systems proces these data to set timing to near a predicted auto-ignition threshold. The present spark knock detectors used with spark controllers are typically a piezoelectric transducer which senses the intense vibrations caused by spark knock. These knock detectors, however, are not sensitive enough t detect incipient engine auto-ignition which may produce a barely detectable engine vibration and therefore the threshold of auto-ignition is not sensed by such transducers. Accordingly, there is a need to provide a spark ignition control system which enables the detection of incipient auto-igniton, thus enabling more precision in setting spark timing in a closed-loop system.

Designers of spark ignition internal combustion engines for motor vehicles are constantly striving to enable the engines to burn leaner air/fuel mixtures (i.e., lower fuel concentration). An air/fuel mixture of approximately 15 to 1 (respectively) is referred to as a stoichiometric mixture and provides just enough oxyge to completely burn the fuel charge. Adding excess air to the combustion chamber, however, has been found to reduce noxious engine emissions such as oxides of nitrogen and hydrocarbons, etc. There are limits, however, to the extent to which the mixture can be leaned before the spark will not produce an exothermic reaction within the combustion chamber. The presen lean limit for most present motor vehicle engines is approximately 20 to 1 air/fuel ratio. Engine designers are striving to increase the lean burn limit of engines, which is theoretically believed to be extendable to about 27 to 1 air/fuel ratio. There is a need therefore to extend the lean limit of spark ignition internal combustion engines.

In newer generation ignition systems, a transformer generally known as an ignition coil is mounted directly on each of the ignition spark plugs and is often referred to as a coil-on-plug (COP) ignition arrangement. The size and mass of such devices placed on the spark plugs is greatly affected by thermal requirements. Windings which operate with high duty cycles (i.e., periods of winding energization cmpared with dwell periods) must be large and massive enough to prevent excessive heating of the winding. Conversely, low duty cycle operation enables the winding to be made more compact and lighter in weight. Reductions in size of COP windings is further desirable to reduce engine packaging constraints. There is accordingly a need to provide an ignition system having a device mounted on the spark plug which is of minimum size and weight.

SUMMARY OF THE INVENTION

In accordance with the present invention, an improved ignition system is provided having the capabilities of providing the above-mentioned desirable features. A solution to the previously discussed problems results from the use of novel ignition system elements which take advantage of various phenomena which occur during the combustion and spark ignition processes which are detected and utilized by the subject ignition system. As a means of more clearly describing the features of the present invention, these principals are outlined below.

For spark ignition systems, there are believed to be three distinct phases of electrical discharge at the spark plug gap. These phases are referred to as the breakdown, arc, and glow phases. In the breakdown phase, which is the initial phase of discharge, a high voltage applied to the spark electrodes at around 10 KV leads to extremely high current flow, on the order of 1,000 amps or more, which occurs within an extremely short period of time, typically in the nanosecond range. Due to the exceptionally short duration of the current flow of this phase, it could not be detected accurately in the past due to the unavailability of measuring instruments having a sufficient dynamic response. Due to the high frequency of the current flowing during the breakdown phase, it is also referred to as the ignition r.f. (radio frequency) current. Once a conductive path at the electrode gap is established during the breakdown phase, the discharge transitions to the arc phase, characterized by low voltage across the gap and moderate current flow over a relatively long duration. During the final or glow phase, low currents and low gap voltage occur. Many investigators including Maly and Vogel (for example, see their article entitled, "Initiation and Propagation of Flame Fronts in Lean CH4-Air Mixtures by the Three Modes of the Ignition Spark") have asserted that it is the breakdown phase of discharge which produces the effect of in initiating an expanding flame front at the spark plug gap, and that the arc and glow phases not only do not contribute to the combustion process, but are actually undesirable from the standpoint of spark plug electrode erosion.

The ignition system according to the present invention employs a pulse transformer system which operates in a distinctly different manner than a conventional ignition coil. Each spark plug has its own ignition pulse transformer attached at its outer end, rather than the conventional arrangement in which a single coil provides a high voltage discharge for each of the multiple spark plugs. In conventional ignition systems using a fly-back type transformer (referred to as a coil), energy is stored as a magnetic field in the coil which is developed through current flow in the primary winding, which when stopped, induces a voltage in the secondary winding due to the collapse of the magnetic field. Although fly-back transformer coil designs have been used successfully for decades, they are electrically inefficient. A principal advantage of the pulse transformer design according to this invention is that inductance of the secondary circuit is greatly decreased which provides the means of firing the spark plug for a much shorter time (typically 50 microseconds), thereby permitting multiple firing. Additionally, the lower impedance allows for the firing of partially fouled spark plugs. In the pulse transformer, spark discharge energ is not stored as a magnetic field. Rather, the pulse transformer merely acts as a quick response step-up transformer which provides a secondary output in response to a voltage spike transmitted to the primary winding.

The described embodiments of the present invention make use of a ferrite toroidal detector which senses the presence of breakdown current within the ignition system as a means of detecting the occurrence and timing of spark discharge, and also as a means of controlling pulse transformer operation to minimize the duration of the arc and glow phase of discharge.

Paschens' law characterizes the relationship between breakdown voltage, and the pressure and temperature existing within the combustion chamber at the point of discharge. This relationship is expressed as:

$$V_b = \frac{KP}{\sqrt{T}}$$

where
$V_b$ is breakdown voltage
K is a constant
P is cylinder pressure
T is cylinder temperature As previously described, the process of auto-ignition is marked by abnormal pressure and temperature fluctuations occurring after TDC, and typically occurs from 5° to 20° after TDC. As a means of detecting the existence of auto-ignition, the ignition system in accordance with this invention applies a predetermined voltage (a so called "hover" voltage) across the spark plug during the time in the engine operating cycle where the pressure and temperature variations of auto-ignition are likely to occur. Since the temperature and pressure conditions occurring cylindrically during auto-ignition relate to a breakdown voltage in accordance with Paschens' law which is momentarily less than the breakdown voltage for normal combustion, spark discharge during that period of the cycle can be made to occur during auto-ignition conditions and not occur during normal ignition conditions, provided that electrode hover voltage is properly selected.

A sensor circuit in accordance with this invention which includes the above mentioned toroidal detector senses the existence of breakdown current, thus signally the occurrence of dischage. This signal is then used to retard, in steps, the engine ignition timing, either for all or individual cylinders, until the auto-ignition stops. Another routine would incrementally advance timing to again develop auto-ignition which would again be corrected, resulting in a timing "dither" at about the threshold of auto-ignition. Therefore, by energizing the spark plug in a predetermined operating window of cycle time after TDC, the spark plug can act as an auto-ignition detector which is far more sensitive than conventional piezoelectric engine knock sensors. Such energization of the spark plug after TDC is not intended to contribute to the combustion process, but is provided only as a means of detecting the existence of auto-ignition. The use of a pulse transformer in accordance with this invention enables the hover voltage to be adjusted to a desired level which is not easily achievable using a conventional fly-back transformer ignition system configuration.

Due to cylinder-to-cylinder variations for a given internal combustion engine, it may be desirable in some circumstances to calibrate each cylinder since the pressure and temperature characteristics of one cylinder may vary from the next, and thus erroneous indications of auto-ignition could result if a fixed hover voltage is used as a sensor of auto-ignition. A calibration reading can be generated in which the spark plug is energized through a range of voltages during a segment of the cylinder operating cycle after TDC, but before the pressure and temperature variations caused by auto-ignition manifest themselves (for example, on the order of 5° after TDC). The voltage at which breakdown occurs during this calibration period can be used to adjust the hover voltage for that cylinder. Therefore, in accordance with this invention, a total of three periods of spark plug energization may occur in a single piston power stroke cycle; a first discharge to initiate spark, a second calibration discharge, and a third period for the etection of auto-ignition.

Upon spark plug discharge, a small ball or "kernel" of ionized gases is formed. Since the fluid within the combustion chamber is turbulent, this small kernel moves away from its point of origination at the spark plug gap. If the air/fuel ratio is sufficiently rich, this kernel will induce an exothermic reaction in which the kernel grows rapidly and becomes a spherical flame front which moves away from its point of origination. If, on the other hand, the air/fuel ratio within the combustion chamber is excessively lean, the high temperature kernel of ionized gas will be quenched by the surrounding fluid so that it decreases in size and disappears as it moves away from the spark plug and no significant energy is derived from the mixture within the combustion chamber.

The air/fuel ratio at which the threshold of endothermic-exothermic reaction occurs is referred to as the lean burn limit of the engine. The present inventor has found that if the spark plug can be caused to discharge a number of times over a very short duration of time (in the microsecond range), the lean burn limit of the engine can be improved (i.e., moved to leaner mixtures). By rapidly firing pulses at the plug, a successive train of kernels of ionized gas is generated which are blown away from their point of origination. Due to the close proximity of the kernels to each other, quenching to the surrounding fluid is minimized. A reduction in quenching permits the ionized gas kernels to exist longer in the combustion chamber which has been found to permit leaner mixtures to combust. The use of a pulse transformer configuration enables such rapid multiple firing which is not possible using conventional fly-back transformer systems due to their significant secondary winding inductance.

In accordance with this invention, rapid multiple firing of the plug is achieved by sensing the existence of breakdown current which signifies the discharge event. This signal is used to immediately curtail that discharge cycle and begin another firing cycle, enabling multiple discharges to occur in a very short time duration.

In accordance with another feature of this invention, the size and mass of the pulse transformer is minimized for structural and packaging efficiency. Inherently, the use of pulse transformers minimizes size and mass which is a significant concern since they are placed on the end of a spark plug where their mass exerts a cantilever loading on the plug due to engine and vehicle vibration. A reduction in size is further advantageous in that it reduces engine packaging constraints. The size and mass of a pulse transformer of this type are greatly affected by thermal requirements. In accordance with this invention, the detection of breakdown current is employed as a means of immediately curtailing the flow of primary current to the spark plug coil; thus, reducing its duty cycle. Since the breakdown phase of spark discharge produces the useful work in initiating combustion, the arc and glow phases can be curtailed without adversely affecting combustion operation. These inventors believe that duty cycles on the order of one percent are possible using an ignition system operated in this manner. Such a low duty cycle enables pulse transformers to be of minimum size and mass; thus, improving engine packaging and structural efficiency.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIGS. 9 through 13 are block diagram flow charts showing the routines implemented by th software controlling the microprocessor of the ignition system according to the present invention in which FIG. 9 represents a scanning routine for initialization of the system, FIG. 10 illustrates the pulse start and delay timer control routine, FIG. 11 illustrates the pulse control routine, FIG. 12 illustrates the pulse width routine, and FIG. 13 represents the ignition and hover control routine.

DETAILED DESCRIPTION OF THE INVENTION

Figure 1:
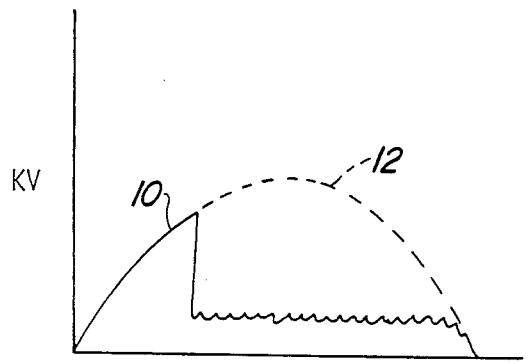
FIG. 1 is a graph relating voltage versus time for the electrical discharge at a spark plug causing ignition of the combustible mixture.
Figure 2:
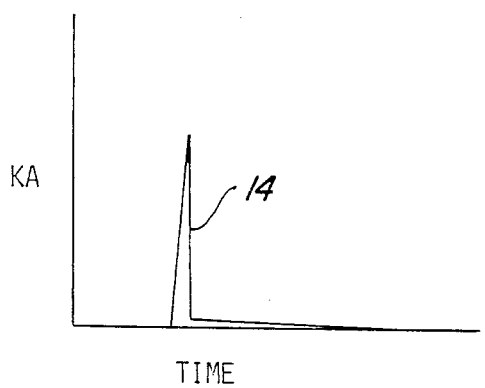
FIG. 2 is a graphical representation of current versus time illustrating the existence of the breakdown or "r.f." current occurring at initial discharge at the spark plug electrodes.
Figure 3:
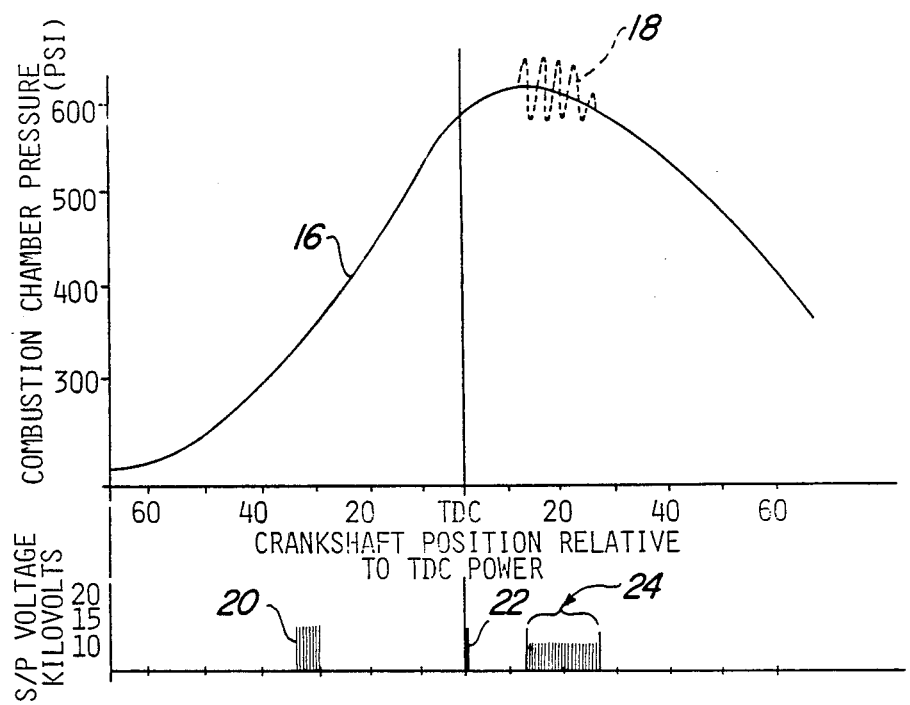
FIG. 3 is a graphical representation of pressure within a combustion chamber with respect to crankshaft position showing normal combustion and pressure fluctuations caused by auto-ignition, and further showing a relationship between crankshaft position and spark plug energization voltage at ignition, calibration, and hover energization periods.

As a way of further explaining the configuration and method of operation of the present invention, FIGS. 1 through 3 are provided which supplement the description contained in the background and summary of the invention sections above, and which serve to establish a framework for discussion of the ignition system of the present invention described with reference to FIGS. 4 through 13.

FIG. 1 illustrates the voltage versus time characteristic of a spark plug of an internal combustion engine in which voltage increases with respect to time until discharge occurs whereupon it drops substantially, as shown by curve 10, thus transitioning into the arc and glow phases of discharge described previously. Curve 12 shown in dashed lines represents the electrode voltage which would be observed absent the discharge event.

FIG. 2 illustrates the relationship between current and time identified by curve 14 illustrating the extremely high breakdown or r.f. current which occurs at the initial moment of spark discharge and lasts for a very short period of time, in the nanosecond range. As previously mentioned, the ignition system in accordance with this invention detects the existence of such breakdown current for use in timing control and sensing of combustion operation as described in greater detail below.

FIG. 3 represents the relationship between crankshaft position and cylinder pressure represented by solid line curve 16 which corresponds with an illustrative normal combustion process. As shown, cylinder pressure increases and peaks just after the piston reaches top dead center on the power stroke and then decreases as the cylinder volume increases. The dotted curve 18 represents the rapid fluctuations in cylinder pressure which occur during auto-ignition. Typically occurring within a range of 5° to 20° after top dead center. These fluctuations result from an explosion in the combustion chamber which causes reverberations within the chamber. Curve 18 illustrates the momentary pressure levels below that of normal combustion occur during auto-ignition, which is detected by the present invention as a momentary decrease in breakdown voltage.

FIG. 3 also illustrates the three distinct periods of spark plug energization employed in connection with the present invention. Pulses 20 are applied before TDC and initiate the combustion process within the engine combustion chamber. Pulse 22 is provided at (as shown) or slightly after TDC as a means of calibrating the auto-ignition detection system, as explained below. Pulse 22 is a ramp or sawtooth waveform which increases with respect to time until discharge occurs at which time it is curtailed. Accordingly, the total pulse width of pulse 22 corresponds to the pressure within the cylinder in accordance with Paschens' law previously described. The breakdown voltage of pulse 22 is used to calibrate the system to accurately detect auto-ignition, while accommodating cylinder-to-cylinder variations. This calibration is conducted before the effects of auto-ignition on breakdown voltage manifest themselves.

Pulses 24 apply "hover" voltage to the plug electrodes which is adjusted to cause discharge in the event of pressure decreases below that of normal combustion and temperature increases, thus detecting auto-ignition.

Figure 4:
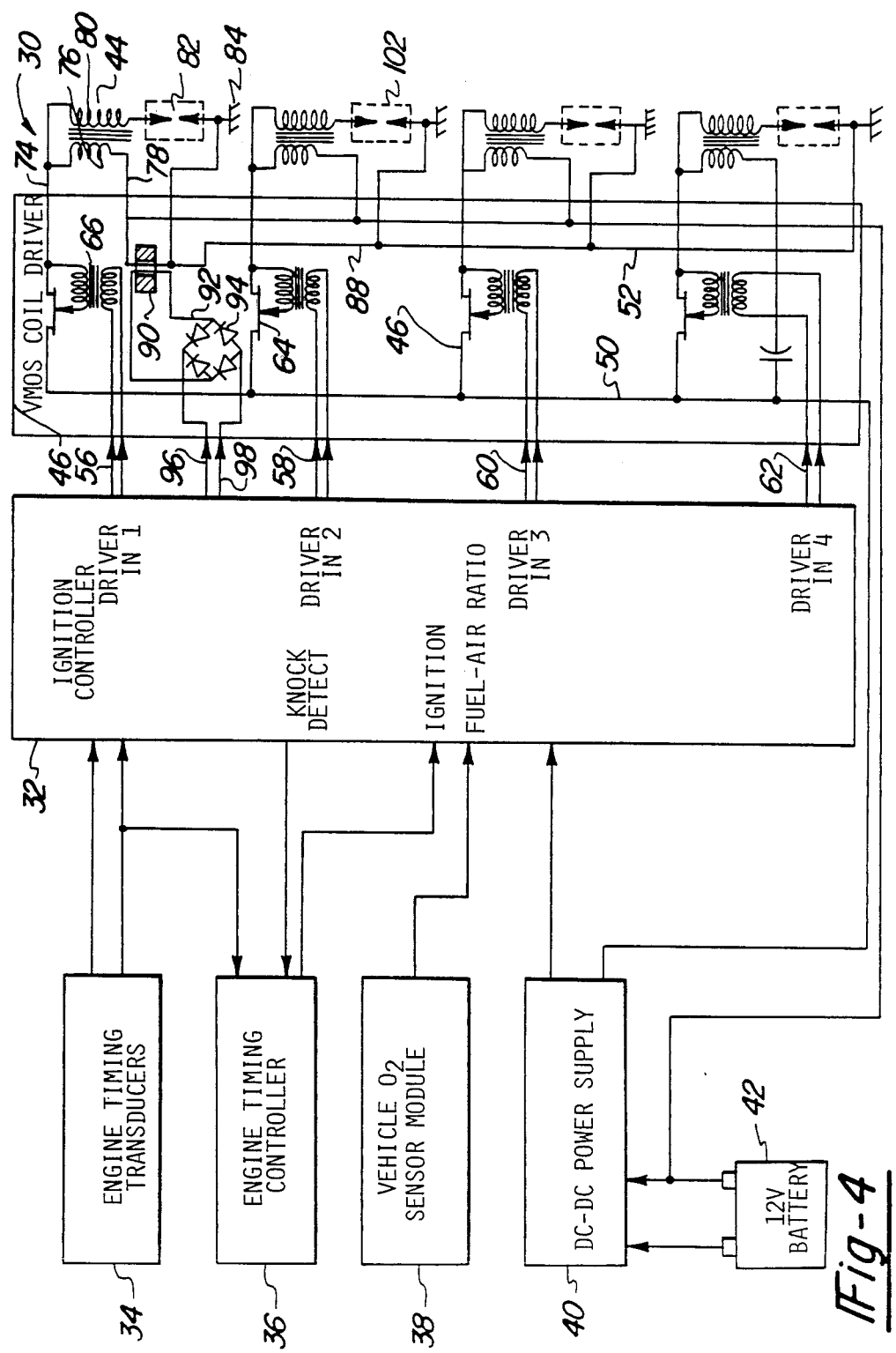
FIG. 4 is a schematic diagram of an ignition system in accordance with the present invention particularly adapted for a four cylinder spark ignition engine.

An improved ignition system in accordance with the present invention is shown in schematic form by FIG. 4 and is generally designated by reference number 30. Ignition system 30 principally includes on-board ignition controller microprocessor 32 which receives input signals from engine timing transducers 34, engine timing controller 36, and vehicle oxygen sensor module 38. Power supply 40 powers the system and receives electrical power from vehicle battery 42. Microprocessor 32 provides output signals to pulse transformers 44 mounted on the spark plugs which are energized by drivers 46.

Engine timing transducers 34 provide pulse signals from a magnetic or optical sensor which detects the position of the engine crankshaft or camshaft to provide a crankshaft position output. The signals from transducers 34 are used to establish ignition timing for the system and for rpm measurements, etc.

Engine timing controller 36 is a microprocessor driven device which receives a signal from timing transducers 34 and processes inputs of a variety of parameters which influence the desired spark timing, including coolant temperature, throttle position, ambient air temperature, manifold absolute pressure, and load sensing, etc., to establish spark advance. Controller 36 also receives signals from microprocessor 32 indicating the existence of auto-ignition. As explained previously engine timing controller 36 seeks to maintain theeengine at the threshold of auto-ignition by advancing timing incrementally until auto-ignition is detected, in which case it is retarded and then incrementally readvanced, thus causing the system to hunt or dither at the threshold of auto-ignition for the particular engine operating parameters existing at any given tie.

Vehicle oxygen sensor module 38 detects oxygen within the exhaust gases of the engine which provides an air fuel ratio input for the system. Typically, the oxygen sensor element is a Zirconium diode mounted in the engine exhaust manifold. The signal from oxygen sensor module 38 is primarily used for controlling a fuel injection system used with the engine.

Figure 5:
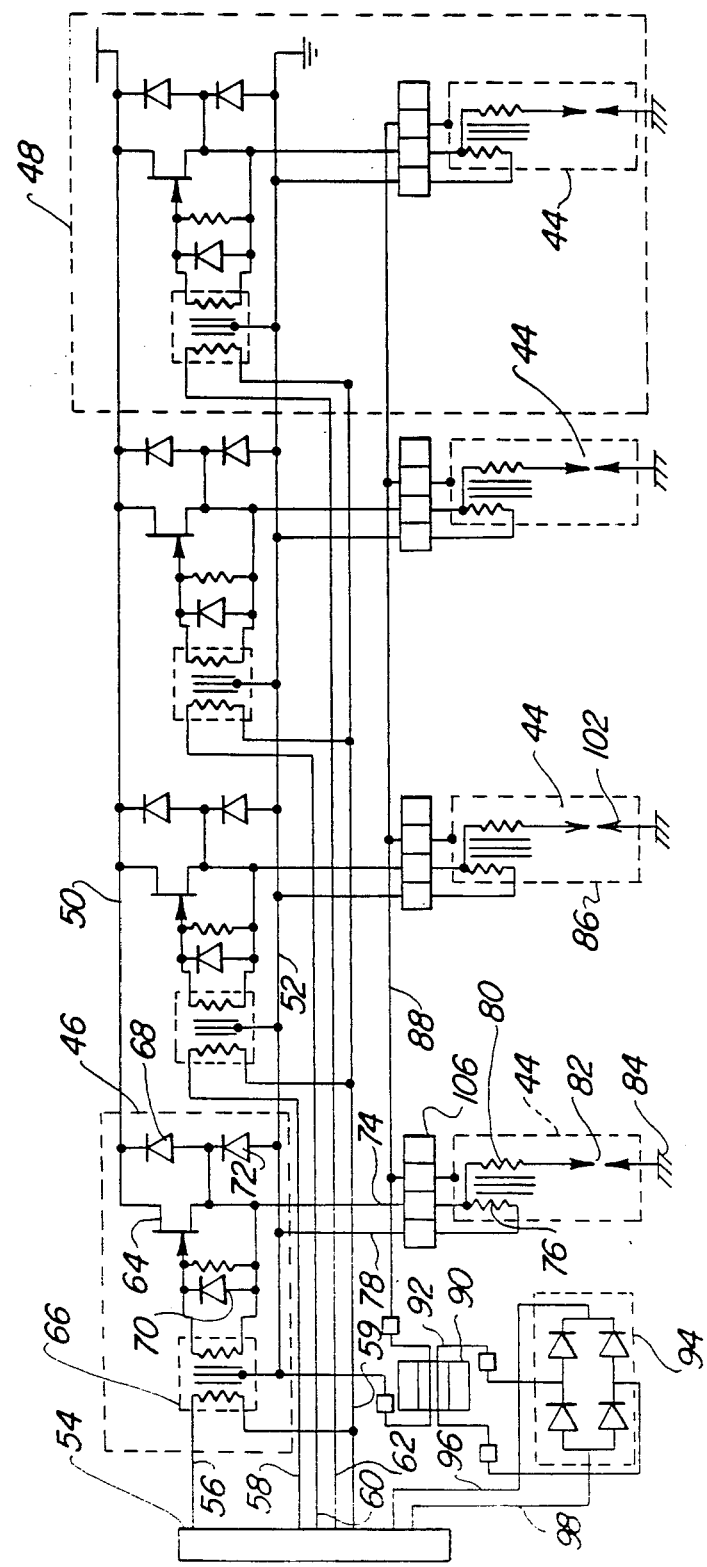
FIG. 5 is an electrical schematic diagram of the pulse transformers and pulse transformer drivers shown in FIG. 1.

Microprocessor 32 receives the above described inputs and outputs, and energizes the associated engine spark plugs through drivers 46 and pulse transformers 44. With particular reference to FIG. 5, pulse transformers 44 and drivers 46 are shown in greater detail with additional circuit components and conductors shown. FIG. 5 shows a series of four pulse transformer 44 and driver 46 subcircuits which are identical for a four cylinder engine. One of these combinations of pulse transformer and driver is identified by reference number 48 and is enclosed by dotted lines in the figure, it being understood that the remaining combinations are identical. Drivers 46 are physically separated from pulse transformers 44 as a precaution since they receive a constant 200 volt DC signal from power supply 40. Driver 46 receives a high level DC voltage along positive bus 50 and ground bus 52. A firing signal from microprocessor 32 is sent through connector 54 along lines 56, 58, 60, and 62 for each of the cylinders, with line 62 provided for driver-pulse transformer combination 48. Line 59 is the common low side of low voltage power supply 40.

The firing signals are transmitted to a VMOS type switching transistor 64 through interface transformer 66 which includes Faraday shields coupled to ground. Diodes 68 and 70 are provided for circuit protection purposes and diode 72 acts as a clamping or snubbing diode. When a firing signal is sent along line 56, a high voltage spike is sent to pulse transformer 44 along line 74, causing the voltage to be conducted through pulse transformer primary winding 76 which returns to ground via line 78. The current flow through primary winding 76 induces a high voltage pulse through secondary winding 80 having a considerably increased voltage. The voltage induced in secondary winding 80 is then sent across the spark plug gap represented by reference number 82.

In accordance with a principal feature of the present invention, means for detecting the so-called breakdown or "r.f." current is provided. Since the r.f. current is of extremely high frequency, the high impedance of the ground return path through the engine block represented by ground 84 makes its detection through that return path difficult. Therefore, another ground return path is provided by spark plug shield 86 which is electrically connected to the base of the spark plug and is connected to r.f. return ground line 88. The signal on line 88 passes through ferrite bead 90 and to ground bus 52. The presence of this high frequency-high current signal through ferrite bead 90 causes a voltage to be induced in loop 92. The output of loop 92 caused by breakdown current is typically about a 50 volt, one nanosecond pulse. Full wave bridge 94 is provided to rectify and clamp the induced signal through ferrite bead 90 which is conducted via lines 96 and 98 t microprocessor 32 through connector 54.

Figure 6:
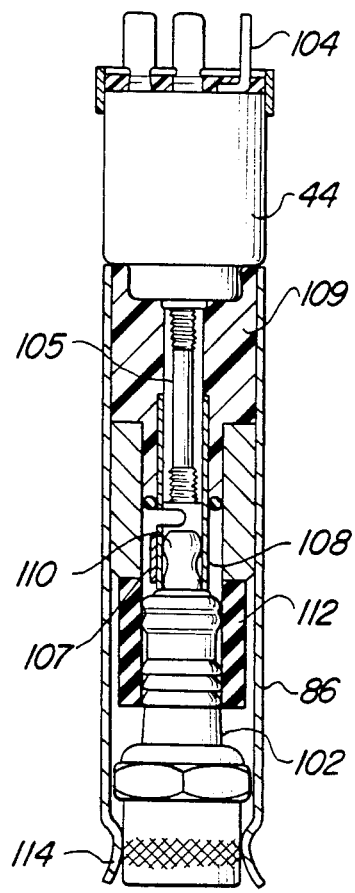
FIG. 6 is a cross-sectional view of the ignition pulse transformer according to this invention mounted to a spark plug.

FIG. 6 represents a cross-sectional view of the ignition pulse transformer 44 as it is positioned on spark plug 102. Pulse transformer 44 contains the previously mentioned primary and secondary windings 76 and 80 and includes terminals 104 for electrical connection to connector 106 (shown in FIG. 5). Terminal post 108 is connected to post 110 of the spark plug and to transformer post 105. The bottom end of post 108 has a gripper socket 107 for engaging spark plug post 110. Rubber boot 112 engages the outer ceramic surface of spark plug 102 to aid in supporting pulse transformer 44. Plastic body 109 serves to mount and support pulse transformer 44. Shield 86 generally surrounds pulse transformer 44 and includes spark plug gripping legs or fingers 114.

Figure 7:
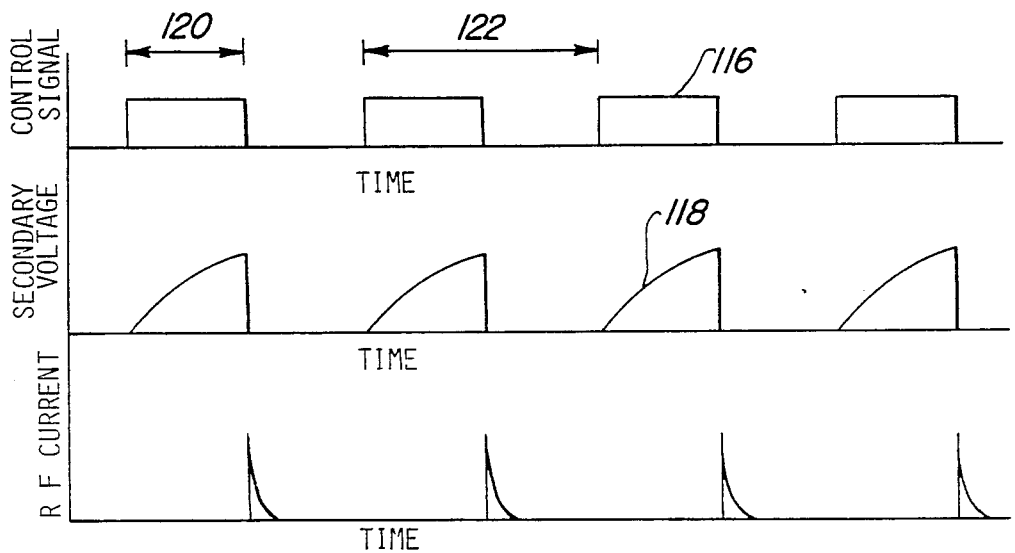
FIG. 7 is a graph showing the relationship of control signals, secondary voltage and r.f. current versus time during the multiple discharge cycle for combustion initiation.
Figure 8:
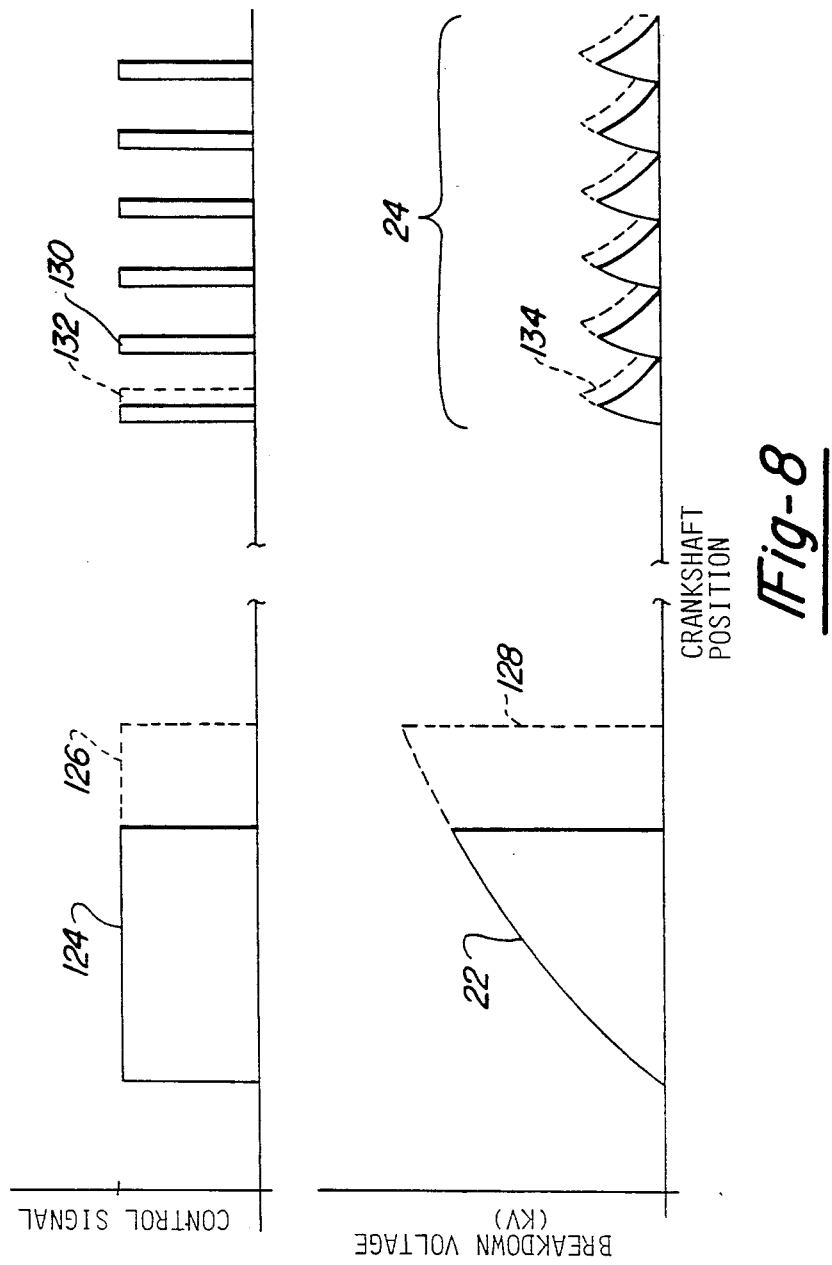
FIG. 8 is a graph showing the relationship between control signals and voltage versus time during the calibration and hover cycles of operation.

FIGS. 7 and 8 show output controls signals from microprocessor 32 at the various phases of ignition operation for one of the engine cylinders. FIG. 7 shows a series of pulses generated to initiate ignition of the combustible mixture within the combustion chamber which occurs before TDC. In FIG. 7 a series of graphs are superimposed to establish a consistent time correspondence in which square wave pulses 116 represents control signals outputted by microprocessor 32 along one of lines 56 through 62. These control signals cause the primary and secondary voltages of pulse transformer 44 to increase over time as shown by sawtooth curve 118 which represents the voltage at the spark plug gap. The secondary voltage represented by sawtooth curves 118 increases to the point of discharge and then decrease, corresponding to the arc and glow phase of discharge, also shown by FIG. 1. The shape of square wave pulses 116 is established by microprocessor 32 which adjusts the variables of pulse width, shown as dimension 120 and pulse period or delay identified by reference number 122.

For a representative experimental embodiment of pulse transformer 44, the primary current "on" time is usually less than 6 microseconds. When breakdown occurs, it is detected by the breakdown current detecting loop 92 through ferrite bead 90 and is used to curtail primary current by switching off transistor 64. The primary current is then redirected through snubbing diode 72, where it continues to flow for up to 60 microseconds. The use of the output from loop 92 allows the interval between firings to be kept as short as possible (approximately 40 to 60 microseconds). This response capability allows multiple firings (e.g., seven pulses) as a means of initiating combustion. As stated previously, such multiple firing enables leaner air fuel ratios to be burnt. This inventor has found that for one automotive engine, a pulse repetition rate of 100 microseconds or less provides enhancements of lean burn capability.

By monitoring the pulse width of control signals 116, a measure of breakdown voltage is provided. Fouled spark plug or pre-ignition would result in a very low breakdown voltage, conversely an extremely high (or unachievable) breakdown voltage would indicate an open circuit condition. Therefore, by measuring breakdown voltage of pulses 20, a means is provided for detecting such abnormal conditions, which could result due to a mechanical failure or malfunctioning of the above described circuits.

In the next phase of spark plug energization, a signal is sent to pulse transformer 44 at a crankshaft position of approximately 5° after TDC. In this point in the cycle, auto-ignition is not ordinarily present and this signal is provided to interrogate or sense the pressure existing within the cylinder before auto-ignition manifests itself. FIG. 8 is similar to previously described FIG. 7 in that it shows both the signals from microprocessor 32 and the voltage they produce at the spark plug gap. Square wave pulse 124 produces pulse 22 as an interrogation signal. Control signal 124 is provided until r.f. current is detected at ferrite bead 90, and is then turned off. Due to the ramping up characteristic of curve 22, the duration of square wave pulse 124 is a function of breakdown voltage. In other words, the phase difference between the leading edge of pulse 124 and the occurrence of breakdown is related to breakdown voltage and cylinder conditions. If cylinder pressures are higher than average (or temperatures lower), pulse 22 will have to ramp to a higher voltage level as shown by dotted lines 126 and 128 before discharge occurs. Conversely, lower than average pressures (or higher temperatures) would be detected by a shortening of the pulse width of pulses 22 and 124.

The final phase of spark plug energization or "hover" phase is also shown in FIG. 8. A series of square wave control signals 130 are outputted by microprocessor 32 and generate a corresponding sawtoothed wave form 24. As previously described, this hover voltage is applied as a mean of detecting auto-ignition within the cylinder. If pressures are following their normal course without auto-ignition, the maximum hover voltage applied at the plug gap will not be sufficient to cause discharge. If, however, auto-ignition occurs, the rapid fluctuations of pressure and temperature within the cylinder will cause a momentary decrease in the breakdown voltage level resulting in discharge which is detected at ferrite bead 90. Detected discharge is then used to retard spark timing.

As previously mentioned, interrogation pulse 22 provides a means of calibrating the appropriate hover voltage level of pulses 24. Therefore, if the cylinder normally operates under higher than average pressures, the maximum level of the hover voltage will also be increased to enable pressure fluctuations caused by auto-ignition to be captured and detected. Conversely, if the normal pressure history is lower than average, hover voltage 24 will be established at a lower level to prevent false indications of auto-ignition which would occur during normal ignition behavior. As a means of providing the calibration, a ratio is provided between the pulse length of curves 124 and 130 so that, the higher the breakdown voltage at the interrogation pulse, the higher the level of the hover voltage 24. FIG. 8 graphically illustrates that a lengthened control signal 130, designated by waveform 132 in dashed lines, results in a higher hover voltage, represented by dashed waveform 134, which would result if the interrogation pulse width is increased as shown by curve 126. During normal combustion without discharge during the hover phase, the voltage at the plug gap gradually dissipates as shown by the sawtooth form of pulses 24.

FIGS. 9 through 15 illustrate, in block diagram form, the software routines which control microprocessor 32 to provided the previously described operation. FIG. 9 illustrates the scanning routine 138 of the software. Key pad inputs are provided for adjusting variables executed in this routine. Block 140 determines whether the cylinders are synchronized so that the firing order is properly sequenced with the outputs from engine timing transducer 34. Block 140 also provides a means for detecting whether or not the associated engine is running. Blocks 142 and 144 determine whether the engine has stalled and evaluate the rpm of the engine. The value of 1000 rpms appears in block 144 as an example of a low engine rpm at which the interrogation and hover signals can be terminated, since auto-ignition will not ordinarily occur in that operating region of the engine. Hover calculation block 146 determines the timing of the hover voltage to place it the desired number of degrees after TDC, and block 148 terminates hover voltage after 35° after TDC.

FIG. 10 illustrates pulse start and delay control routine 150 of the pulse timer within microprocessor 32 which sets pulse width 120 and starts the delay timer which sets pulse period 122 for the control pulses sent by microprocessor 32 to pulse transformers 44 during the ignition, interrogation, and hover cycles.

Figure 11:
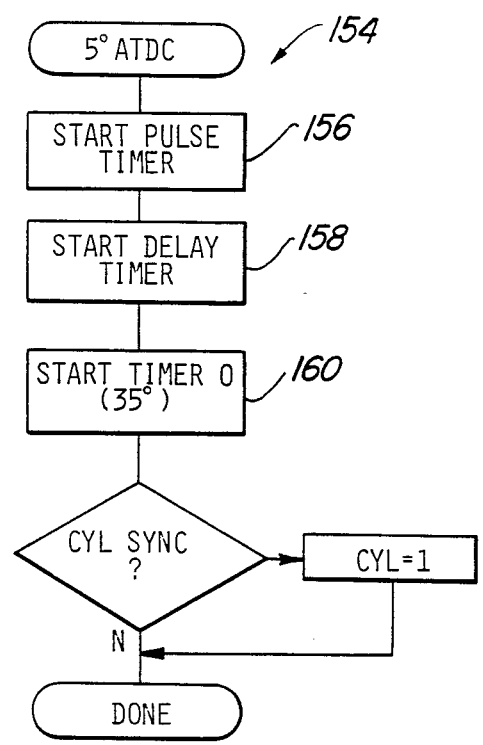

FIG. 11 illustrates pulse control routine 154 which determines the width 120 and period 122 of pulses in the hover mode. Upon an input from engine timing transducers 34, the pulse width, and delay timers are started as designated by blocks 156 and 158 respectively. Block 160 calculates 35° after TDC which is inputted to block 148 of FIG. 9.

Figure 12:
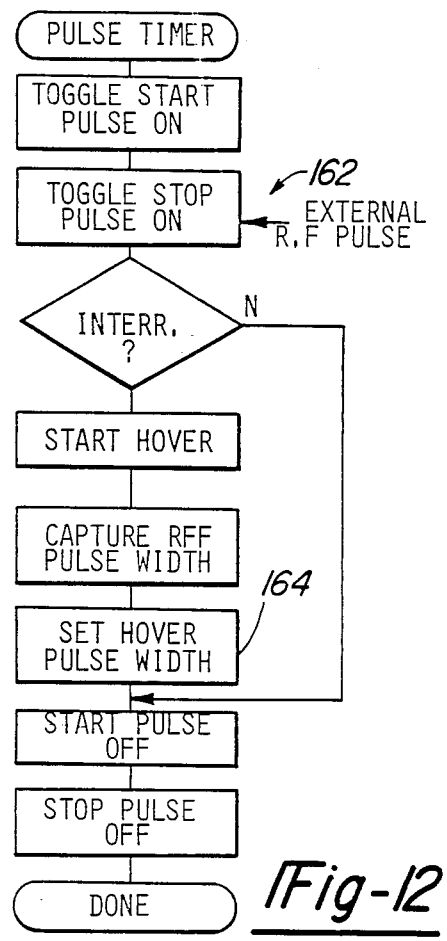

FIG. 12 illustrates the pulse width routine 162 which indicates the pulse timer starting under software control and stopping by software or the external r.f. current signal. In this routine, the pulse width of the interrogation pulse is captured and used to set hover pulse width at block 164.

Figure 13:
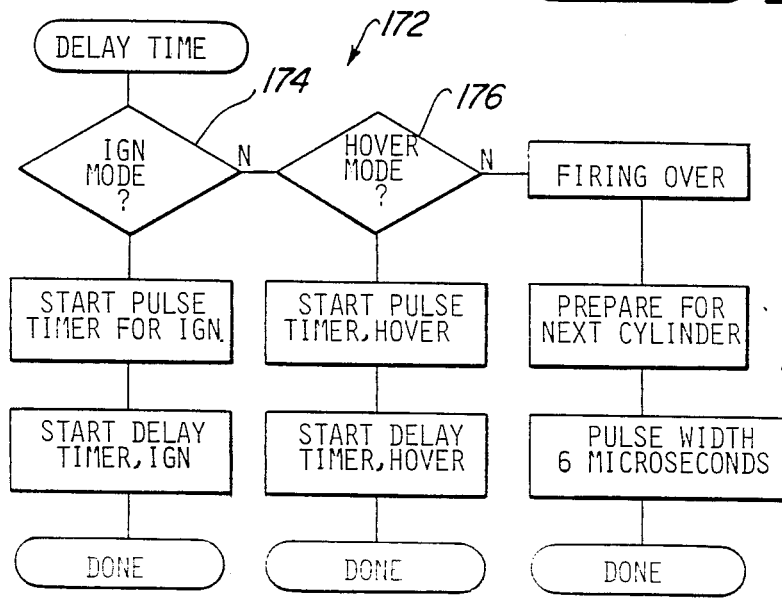

FIG. 13 illustrates the ignition and hover mode control routine 172. This routine includes two blocks 174 and 176 relating to the ignition and hover modes, respectively. For each of these blocks, the pulse and delay timers are started to establish proper pulse width and period.

While the above description constitutes the preferred embodiments of the present invention, it will be appreciated that the invention is susceptible to modification, variation and change without departing from the proper scope and fair meaning of the accompanying claims.

I claim:

1. An ignition system for a spark ignition internal combustion engne comprising:
a pulse transformer having a primary winding and a secondary winding connected to a spark plug;
driver means for supplying a voltage signal to said pulse transformer primary winding thereby including a high voltage signal and said secondary winding applied to said spark plug;
controller means for providing control signals to said driver means, thereby causing said driver means to generate a voltage applied to said secondary winding, and
discharge detection means for sensing the occurrence of electrical discharge across said spark plug and applying a discharge signal to said controller means for controlling the operation of said controller means;
wherein said ignition system detects the existence of auto-ignition characterized by pressure and temperature fluctuations within said engine combustion chamber occurring after piston top dead center which departs from normal combustion, and further comprising timing means for sensing the position of the piston and for providing a timing signal, and wherein said controller means applies a hover voltage of a predetermined maximum level across said spark plug during a period of the cylinder cycle operating cycle after piston top dead center, said hover voltage applied at a level at which discharge across said spark plug occurs in the event that said combustion chamber is experiencing auto-ignition but does not occur if the conditions within the cylinder are of normal combustion, wherein said discharge detection means thereby provides an indication of the existence of auto-ignition.

2. An ignition system according to claim 1 wherein said period of the cylinder of the operating cycle is within the range between 5° and 35° after piston top dead center.

3. An ignition system according to claim 1 wherein said hover voltage comprises a series of pulses each having a maximum voltage at said predetermined maximum level.

4. An ignition system according to claim 1 wherein said means for detecting comprises a shield electrically connected to the spark plug body, a conductor electrically connecting said shield to an electrical ground and a current detector for sensing current in said conductor.

5. An ignition system according to claim 1 wherein said controller means further applies an interrogation pulse across said spark plug gap in a portion of the piston operating cycle in which auto-ignition does not occur as a means of establishing said predetermined maximum level of said hover voltage, said interrogation pulse voltage increasing with respect to time untildischarge occurs and wherein said hover voltage is adjusted in accordance with the pulse width of said interrogation pulse.

6. An ignition system according to claim 5 wherein said interrogation pulse is applied at about piston top dead center.

7. An ignition system according to claim 1 wherein said controller means further retards spark timing upon sensing of auto-ignition and thereafter advances timing whereby said ignition system operates at about the threshold of auto-ignition.

8. An ignition system for a spark ignition internal combustion engine comprising:
a pulse transformer having a primary winding and a secondary winding connected to a spark plug;
driver means for supplying a voltage signal to said pulse transformer primary winding thereby inducing a high voltage signal and said secondary winding applied to said spark plug;

controller means for providing control signals to said driver means, thereby causing said driver means to generate a voltage applied to said secondary winding, and discharge detection means for sensing the occurrence of electrical discharge across said spark plug and applying a discharge signal to said controller means for controlling the operation of said controller means;

wherein said controller means minimizes the duty cycle of said transformer by terminating the control signal to said driver means upon the detection of discharge by said discharge detector means.

9. An ignition system for a spark ignition internal combustion engine which detects the existence of auto-ignition characterized by pressure and temperature fluctuations within the engine combustion chamber occurring after piston top dead center which departs from normal combustion, comprising:

timing means for sensing the position of the piston and for providing a timing signal, an ignition spark plug having electrodes presenting an air gap within the combustion chamber, electrical energy source means for applying voltage to said spark gap air gap, controller means for receiving said timing signal and controlling said energy source means for applying a hover voltage of a predetermined maximum level across said spark plug gap during a period of the cylinder operating cycle after piston top dead center, said hover voltage applied at a level at which discharge across the spark plug occurs in the even that said combustion chamber is experiencing auto-ignition but does not occur if the conditions within the cylinder are of normal combustion, and discharge detection means for sensing the occurrence of electrical discharge across said spark plug gap caused by said hover voltage, thus providing an indication of the existence of auto-ignition.

10. An ignition system according to claim 9 wherein said period of the cylinder operating cycle is within the range between 5o and 35o after piston top dead center.

11. An ignition system according to claim 9 wherein said hover voltage comprises a series of pulses each having a maximum voltage at said predetermined maximum level.

12. An ignition system according to claim 9 wherein said discharge detection means comprises; a pulse transformer having a primary winding and a secondary winding connected to said plug, a driver circuit for supplying a voltage signal to said pulse transformer primary winding, and means for detecting the short duration high level current flow occurring at the initiation of discharge across said spark plug gap.

13. An ignition system according to claim 12 wherein said means for detecting comprises a shield electrically connected to the spark plug body, a conductor electrically connecting said shield to an electrical ground, and a current detector for sensing current in s id conductor.

14. An ignition system according to claim 9 wherein said controller means further applies an interrogation pulse across said spark plug in a portion of the piston operating cycle in which auto-ignition does not occur as a means of establishing said predetermined maximum level of said hover voltage, said interrogation pulse voltage increasing with respect to time until discharge occurs and said hover voltage is adjusted in accordance with the pulse width of said interrogation pulse.

15. An ignition system according to claim 14 wherein said interrogation pulse is applied at piston top dead center.

16. An ignition system according to claim 9 wherein said controller means further retards spark timing upon sensing of auto-ignition and thereafter advances timing whereby said ignition system operates at about the threshold of auto-ignition.

17. An ignition system for a spark ignition internal combustion engine which detects the existence of auto-ignition characterized by pressure and temperature fluctuations within the engine combustion chamber occurring after piston top dead center which departs from normal combustion comprising:

timing means for sensing the position of the piston and for providing a timing signal, an ignition spark plug having electrodes presenting and air gap within the combustion chamber, a pulse transformer mounted directly to said spark plug having a primary winding and a secondary winding, said secondary winding electrically connected to said spark plug electrodes, a driver circuit for transmitting a pulse of voltage to said pulse transformer primary winding in response to control signals thereby producing a high voltage signal at said spark plug electrodes, a spark discharge detector including a ground return conductor electrically connected to one of said spark plug electrodes connected to ground, said conductor also connected to ground and further including a current detector for sensing current flow in said conductor, wherein said spark discharge detector senses the short duration high level current flow which occurs at the onset of arcing across said spark plug gap, and controller means for receiving said timing signals and providing said control signals to said driver circuit, said controller means applying a hover voltage of a predetermined maximum level across said spark plug gap during a period of the cylinder operating cycle after piston top dead center, said hover voltage maximum level being set such that which discharge across the spark plug occurs in the event that said combustion chamber is experiencing auto-ignition, but does not occur if the conditions within the cylinder are of normal combustion, and said controller means modifying spark timing in response to said spark discharge detector.

18. An ignition system according to claim 17 wherein said period of the cylinder operating cycle is within the rang between 5° and 35° after piston top dead center.

19. An ignition system according to claim 17 wherein said hover voltage comprises a series of pulses each having a maximum voltage at said predetermined maximum level.

20. An ignition system according to claim 17 wherein said controller means further applies an interrogation pulse across said spark plug in a portion of the piston operating cycle in which auto-ignition does not occur as a means of establishing said predetermined maximum level of said hover voltage, said interrogation pulse voltage increasing with respect to time until discharge occur and said hover voltage is adjusted in accordance with the pulse width of sai interrogation pulse.

21. An ignition system according to claim 20 wherein said interrogation pulse is applied at about top dead center of the piston during the power stroke.

22. An ignition system according to claim 17 wherein said controller means further retards spark timing when it senses auto-ignition and advances spark timing when it does not sense auto-ignition thereby operating at the threshold of auto-ignition.

23. An ignition system for a spark ignition internal combustion engine which detects the existence of auto-ignition characterized by pressure and temperature fluctuations within the engine combustion chamber occurring after piston top dead center which departs from normal combustion comprising:

timing means for sensing the position of the piston and for providing a timing signal,
   an ignition spark plug having electrodes presenting an air gap within the combustion chamber,
   a pulse transformer mounted directly to said spark plug having a primary winding and a secondary winding, said secondary winding electrically connected to said spark plug electrodes,
   a driver circuit for transmitting a pulse of voltage to said pulse transformer primary winding in response to control signals thereby producing a high voltage signal at said spark plug electrodes,
   a spark discharge detector including a ground return conductor electrically connected to one of said spark plug electrodes connected to ground, said conductor also connected to ground and further including a current detector for sensing current flow in said conductor, wherein said spark discharge detector senses the short duration high level current flow which occurs at the onset of arcing across said spark plug gap, and
   controller means for receiving said timing signals and providing said control signals to said driver circuit, said controller means providing an interrogation control signal at a period of the piston operating cycle where auto-ignition does not normally occur, said interrogation control signal causing an interrogation pulse voltage at said spark plug gap to increase over time until said interrogation voltage reaches the breakdown voltage which causes discharge across said gap, said breakdown voltage being affected by pressure and temperature conditions that said spark plug electrodes are exposed to, and for measuring the phase difference between the leading edge of said interrogation control signal and said breakdown current which said phase difference is an indication of said conditions, said controller means further applying a hover voltage of a predetermined maximum level across said spark plug gap during a period of the cylinder operating cycle after piston top dead center, said hover voltage applied a a level at which discharge across the spark plug occurs in the event that said combustion chamber is experiencing auto-ignition but does not occur if the conditions within the cylinder are of normal combustion, and said controller means further for adjusting the level of said hover voltage in response to s id phase difference to thereby adjust said hover voltage in response to said interrogation pulse breakdown voltage.

24. An ignition system according to claim 23 wherein said period of the cylinder operating cycle is within the range between 5° and 35° after piston top dead center.

25. An ignition system according to claim 23 wherein said hover voltage comprises a series of pulses each having a maximum voltage at said predetermined maximum level.

26. An ignition system according to claim 23 wherein said interrogation pulse is applied at about piston top dead center.

27. An ignition system according to claim 23 wherein controller means further applies an ignition control signal at a point of the piston operating cycle before top dead center to initiate combustion in said chamber, and wherein when said breakdown is sensed during said hover, indicating the occurrence of auto-ignition, said controller means retards spark advance to reduce the likelihood of auto-ignition.

28. An ignition system according to claim 27 wherein said controller means further incrementally advances spark timing when auto-ignition is not sensed.

29. An ignition system for a spark plug ignited internal combustion engine for improved lean air/fuel mixture burn limits comprising:

a pulse transformer having a primary winding and a secondary winding connected to the spark plug;
   driver circuit means for supplying a voltage pulse to said pulse transformer primary winding thereby inducing a high voltage in said secondary winding;
   controller means for generating control signals causing said driver circuit means to cause said pulse transformer to output a series of pulses from said secondary winding thereby causing a series of spark discharges starting less than 100 microseconds apart, whereby the multiple firing of the spark plug enables leaner air/fuel mixtures to be combusted as compared with a single spark discharge; and
   discharge detection means for sensing the occurrence of electrical discharge across the spark plug electrodes and wherein said controller means terminates said control signal upon the detection of said discharge.

30. An ignition system according to claim 29 wherein said discharge detection means comprises; a pulse transformer having a primary winding and a secondary winding connected to the spark plug, a driver circuit for supplying a voltage signal to said pulse transformer primary winding, and means for detecting the short duration high level current flow occurring at the initiation of discharge across the spark plug gap.

31. An ignition system according to claim 30 wherein said means for detecting further comprises a shield electrically connected to the spark plug body, a conductor electrically connecting said shield to an electrical ground, and a current detector for sensing current in said conductor.

32. An ignition system for a spark plug ignited internal combustion engine for improved lean air/fuel mixture burn limits comprising;

a pulse transformer mounted to the spark plug and having a primary winding and a secondary winding connected to the spark plug,
   driver circuit means for supplying a voltage pulse to said pulse transformer primary winding thereby inducing a higher voltage in said secondary winding,
   controller means for generating control signals causing said driver circuit means to cause said pulse transformer to output a series of pulses from said secondary windings thereby causing a series of spark discharges across electrodes of said spark plug, said discharges starting less than 100 microseconds apart, whereby the multiple firing of the spark plug enables leaner air/fuel mixtures to be combusted as compared with a single spark plug discharge, and discharge detection means for sensing the occurrence of electrical discharge across the spark plug electrodes and providing a signal to said controller means for terminating said control signal upon the detection of said discharge.

33. An ignition system according to claim 32 wherein said discharges are about 70 microseconds apart.

34. An ignition system according to claim 32 wherein said means for detecting further comprises a shield electrically connected to the spark plug body, a conductor electrically connecting said shield to an electrical ground, and a current detector for sensing currnt in said conductor.

35. An ignition system for a spark ignition internal combustion engine comprising
- a pulse transformer having a primary winding and a secondary winding connected to said plug,
- driver circuit means for supplying a voltage signal to said pulse transformer primary winding thereby inducing a high voltage pulse in said secondary winding applied to said spark plug gap,
- controller means for providing control signals to said driver circuit means,
- discharge detection means for sensing the occurrence of electrical discharge across said spark plug gap caused by said pulse transformer secondary voltage, and
- said controller means receiving a discharge signal from said discharge detection means and causing said control signal to be curtailed thereby minimizing the duration of said secondary winding pulse.

36. An ignition system according to claim 35 whereby said controller means causes the duty cycle of said pulse transformer to be minimized.

37. An ignition system according to claim wherein said duty cycle is about 1 percent.

38. An ignition system according to claim 35 wherein said discharge detection means comprises; a pulse transformer having a primary winding and a secondary winding connected to said plug, a driver circuit for supplying a voltage signal to said pulse transformer primary winding, and means for detecting the short duration high level current flow occurring at the initiation of discharge across said spark plug gap.

39. An ignition system according to claim 35 wherein said means for detecting comprises a shield electrically connected to the spark plug body, a conductor electrically connecting said shield to an electrical ground, and a current detector for sensing current in said conductor.

40. An ignition system for a spark ignition internal combustion engine which senses abnormal conditions within the engine combustion chamber comprising;
- a pulse transformer having a primary winding and a secondary winding connected to said plug,
- driver circuit means for supplying a voltage signal to said pulse transformer primary winding thereby inucing a high voltage pulse through said secondary winding,
- controller means for providing a control signal to said driver circuit means whereby at the onset of said control signal, the voltage at a spark plug rises with respect to time until a breakdown voltage is reached causing electrical discharge across the spark plug, and wherein normal operation of said engine will result in said breakdown voltage having a magnitude within a voltage range, and wherein abnormal conditions within said combustion chamber will result in a breakdown voltage which is outside said range,
- discharge detection means for sensing the short duration, high level current flow occurring at the initiation of discharge across the spark plug, and
- wherein said controller means measures the breakdown voltage thereby providing a means for detecting said abnormal con itions.

41. An ignition system according to claim 40 wherein said controller means measures said breakdown voltage by detecting the elapsed time between the leading edge of said control signal and the time of electrical discharge across said spark plug.

42. An ignition system according to claim 40 wherein a measured breakdown voltage below said range indicates the presence of pre-ignition and a measured breakdown voltage above said range indicates abnormal spark plug condition.

* * * * *